(12) United States Patent  
Kirchdoerffer

(10) Patent No.: US 6,532,650 B1
(45) Date of Patent: Mar. 18, 2003

(54) PROCESS OF MAKING AN ENCAPSULATED ELECTRONIC DEVICE

(76) Inventor: Remy Kirchdoerffer, 32 rue du General Koenig, 67110 Reichshoffen (FR)

( * ) Notice: Subject to any disclaimer, the term of this patent is extended or adjusted under 35 U.S.C. 154(b) by 0 days.

(21) Appl. No.: 09/604,124

(22) Filed: Jun. 26, 2000

(30) Foreign Application Priority Data

Jun. 24, 1999 (FR) .......................................... 99 08203

(51) Int. Cl.$^7$ ................................................ H05K 3/30
(52) U.S. Cl. ...................... 29/841; 29/832; 29/592.1; 29/593; 29/855; 73/727; 73/721; 73/706
(58) Field of Search ...................... 29/841, 832, 25.35, 29/592.1, 593, 846, 621.1, 855; 73/116, 727, 721, 706; 361/784; 338/4, 42; 174/52.5

(56) References Cited

U.S. PATENT DOCUMENTS

| | | | | |
|---|---|---|---|---|
| 4,751,029 A | * | 6/1988 | Swanson ................... | 264/40.4 |
| 4,874,336 A | * | 10/1989 | Marsh ........................ | 439/607 |
| 5,144,843 A | * | 9/1992 | Tamura et al. ................ | 73/727 |
| 5,548,996 A | | 8/1996 | Shinjo | |
| 5,732,465 A | * | 3/1998 | Tokita et al. ................. | 29/841 |
| 5,909,915 A | * | 6/1999 | Okuda ......................... | 29/841 |
| 6,188,307 B1 | * | 2/2001 | Katsuki et al. ........... | 338/22 R |

FOREIGN PATENT DOCUMENTS

| | | | | |
|---|---|---|---|---|
| DE | 42 03 832 | | 8/1992 | |
| EP | 0 282 967 | | 9/1988 | |
| JP | 61226625 | * | 10/1986 | ................... 73/777 |

* cited by examiner

Primary Examiner—Peter Vo
Assistant Examiner—Minh Trinh
(74) Attorney, Agent, or Firm—Young & Thompson

(57) ABSTRACT

A process for the production of a device for measuring or detecting, particularly a probe or a detector, includes the steps of pre-mounting the different active components of the device, of which certain are ultimately gathered in functional subassemblies on and/or in a support body, then potting the pre-mounted resulting assembly, as well as its connection regions with a connection and/or supply cable, to form a substantially monoblock member and, finally, overmolding under pressure the potted member, as well as the proximal portion of the cable, with a thermoplastic material compatible with the resin used, to obtain an apparatus or instrument having the desired shape.

8 Claims, 3 Drawing Sheets

PROCESS OF MAKING AN ENCAPSULATED ELECTRONIC DEVICE

BACKGROUND OF THE INVENTION

The present invention relates to the production of electronic devices, particularly in the field of measurement and detection, and has for its object a process for producing a device of the mentioned type, as well as devices thus obtained.

There is already known at present the potting technique to clad electronic components and thereby to ensure their protection. However, this technique is relatively slow and does not permit efficient production, in large quantity, of products of medium or large size. It is moreover limited in terms of diversity of the resulting external shapes and leads, because of the nature of the material used, to products whose mechanical properties (particularly rigidity) and resistance to shock and to chemical aggression are undesirable, even rendering their use impossible, in certain applications, in particular in industry.

Moreover, there is also known the technique of overmolding pieces or articles, by covering them with a layer of thermoplastic material to give them their final shape and to insulate and physically protect the overmolded pieces or articles relative to the environment.

Nevertheless, this technique subjects the overmolded elements to thermal shock (molten material) and mechanical shock (material applied under pressure), which does not permit the use of this technique for sensitive or delicate electronic components, without the risk of damage or breakage of their connections, as the case may be.

SUMMARY OF THE INVENTION

The present invention has particularly for its object to overcome the mentioned drawbacks, in particular, but not in a limiting way, in relation to apparatus or instruments for measuring and/or detection for industrial use, integrating sensitive components and requiring effective protection.

To this end, the present invention has for its object a process for the production of a device of the instrument or apparatus type for measuring or detection, particularly for a sensor or detector, consisting essentially in pre-mounting the different components of the device, of which certain are ultimately to be gathered into one or several functional subassemblies, on and/or in a support body, then potting at least partially the resulting pre-mounted assembly, as well as if desired the connection regions with a connection and/or supply cable, to form a substantially monoblock piece, and, finally, overmolding under pressure said potted piece, as well as if desired the proximal portion of the cable, with a thermoplastic material compatible with the resin used, to obtain an apparatus or instrument having the desired shape.

BRIEF DESCRIPTION OF THE DRAWINGS

The invention will be better understood, from the following description, which relates to preferred embodiments, given by way of non-limiting examples, and explained with reference to the accompanying schematic drawings, in which.

DESCRIPTION OF THE PREFERRED EMBODIMENTS

Figure 1:
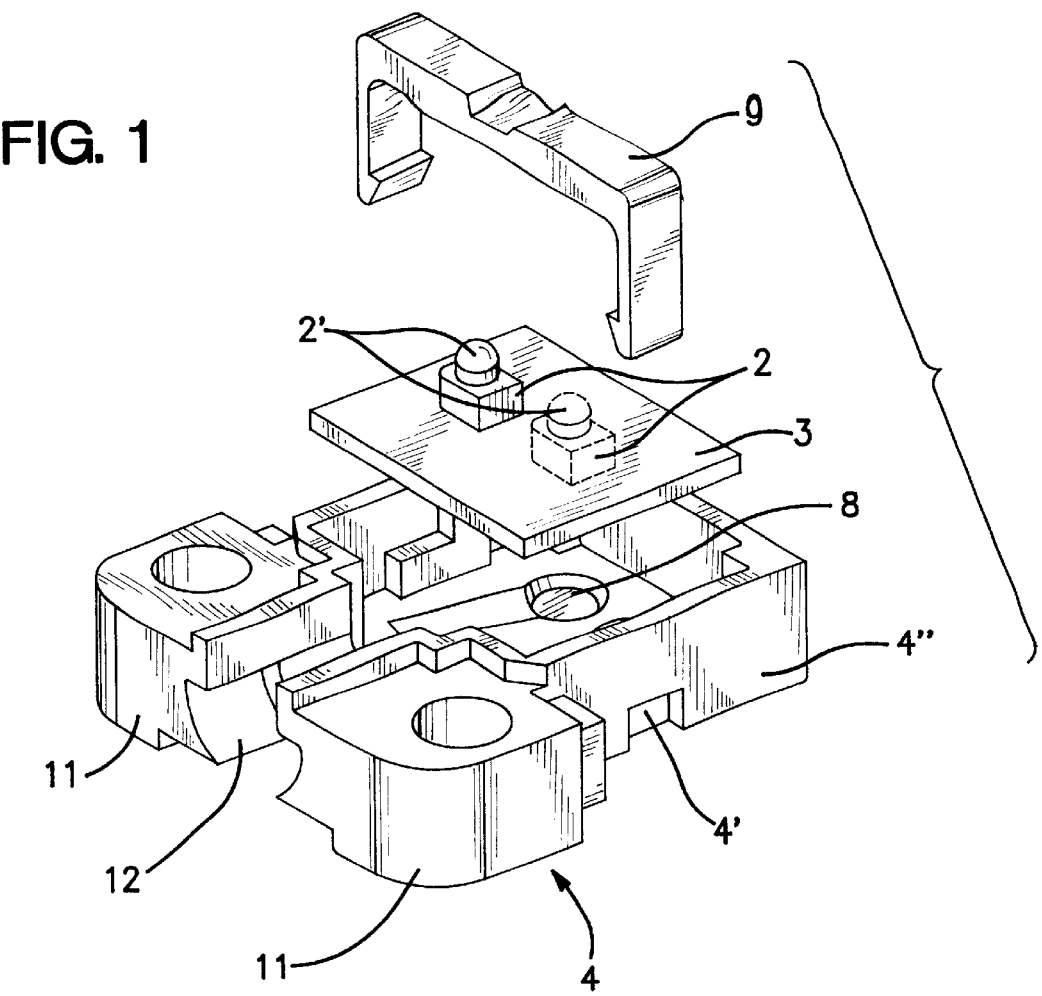
FIG. 1 is an exploded side perspective view of a device of the sensor type with pre-mounting of its functional components on a support body.
Figure 2:
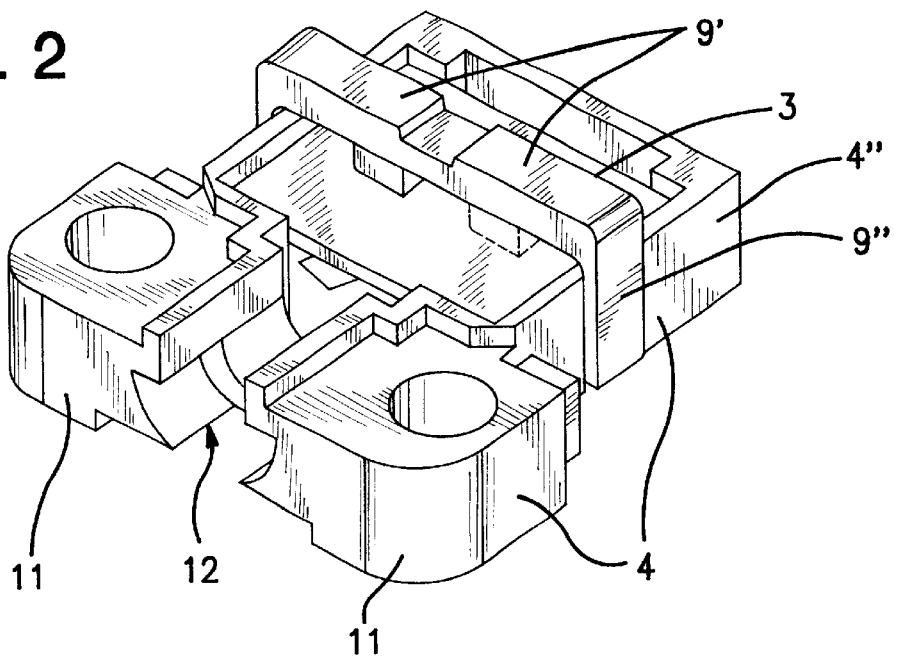
FIG. 2 is a view similar to that of FIG. 1 of the same device after pre-mounting.
Figure 3:
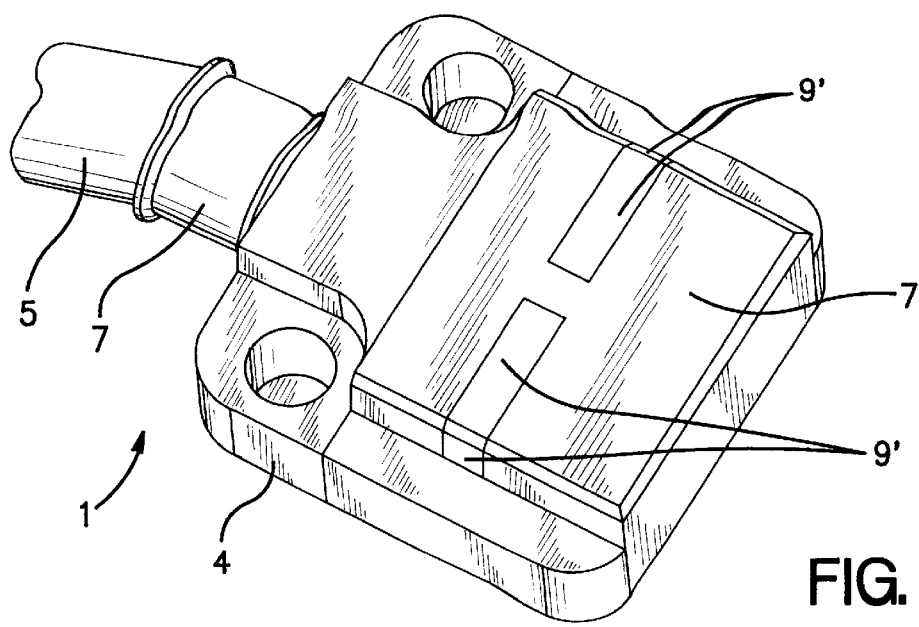
FIG. 3 is a top perspective view of the device of FIGS. 1 and 2 in the finished state after potting and overmolding.

According to this latter, and as shown in FIGS. 1 to 3 of the accompanying drawings, the production process consists essentially in pre-mounting the different active components 2, 2' of the device 1, 1', of which certain ones are eventually to be grouped in functional subassemblies 3, on or in a support body 4, then potting the resulting pre-mounted assembly, as well as if desired its connection regions with a connection and/or supply cable 5, to form a substantially monoblock piece, and, finally, overmolding under pressure said potted piece, as well as if desired the proximal portion of the cable 5, with a thermoplastic material 7 compatible with the resin 6 that is used, to obtain an apparatus or instrument 1, 1' having the desired shape and as the finished product of molding.

Such a process of production in three distinct successive phases permits standardized production in large quantity, a high flexibility of the final shapes for the same type of devices 1, 1' and easy automation with a low rejection rate.

In particular, the cladding in two consecutive phases with two different materials permits guaranteeing perfect final sealing of the device 1, 1', an increased mechanical protection of the active components 2, 2', of electrical or electronic nature, and their internal connections, particularly relative to shocks, and a standardization of the production in spite of a great diversity of shapes and of possible materials (a monoblock potted piece can be overmolded with various shapes and materials), whilst reducing greatly the production time relative to devices 1, 1' that are entirely potted or obtained by assembly of different elements.

The support body 4 is made of a material which permits ensuring different mechanical functions during pre-mounting, potting and overmolding (positioning and holding the active elements 2, 2' and if desired subassemblies 3, precise positioning during potting and overmolding) and constituting the skeleton of the final device 1, 1', giving to it its structural cohesion and its mechanical resistance. This piece 4 could be made in the form of a piece of injected plastic material or in the form of a metallic piece, as the case may be, pre-assembled or shaped by a matrix.

To avoid, for example in the case of a probe 1 or a detector 1', a modification of the detection or measuring characteristics after potting, it can be provided that the potted piece be disposed in the overmolding mold by injection such that at least one surface or a portion of the surface 8 forming, as the case may be, the detection surface, is not covered by the overmolding material 7, said surface or portion of surface 8 being if desired delimited laterally by channel or similar reinforcements constituting with the overmolding material 7 sealing baffles.

Thus, after the potting operation, the assembly of other functional characteristics of the probe or the detector 1' are of particular parameters and are operational and can be as a result entirely tested before overmolding.

The potting permits particularly protecting active components 2, 2', particularly the electronic ones, and the soldered connections and guaranteeing a good mechanical strength of the piece to be overmolded during the overmolding operation.

Moreover, by potting the pre-mounted assembly (active components 2, 2'/subassemblies 3/support body 4), it is possible to overmold this latter under high pressure and with a hard material 7 (thermoplastic material with a high Shore hardness) requiring a high temperature for its practice, because there is no direct contact between the fragile and/or heat-sensitive components 2, 2' and the overmolding material 7.

So as to facilitate the handling of the device 1, 1' and to guarantee a preservation of the initial positioning of the components 2, 2' and subassemblies 3 after pre-mounting and during the potting phase, it can be provided to emplace at least one retaining member 9 to maintain the active components 2, 2' and/or the subassemblies 3 of such components, on and/or in the support body 4 after the pre-mounting phase and before potting.

Figure 4:
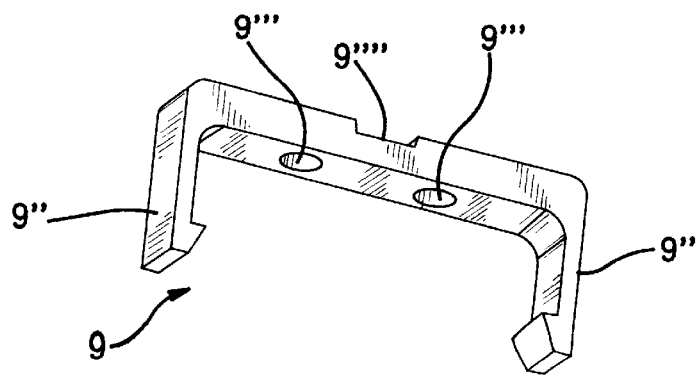
FIG. 4 is a perspective view of a stirrup used for pre-mounting constituent elements of the device of FIGS. 1–3.

As shown in FIGS. 2 and 4 of the accompanying drawings, the retention member can preferably have a generally U shape, for example with two resiliently deformable wings 9" ending in hooks, and is secured to the support body 4 by means of a snap-in engagement at the level of the gripping portions 4' formed on said support body.

When the device 1, 1' has indicators 2' to signal its condition or the functions performed, the retention member 9 can cover at least such a luminous signal 2' and constitute a light guide for this or these latter, by means of a portion 9' of its external surface of said member 9 not being covered by the overmolding material 7.

This member 9 would then preferably comprise one or more openings 9'" for the reception of said signals 2' and would be made of a transparent or translucent material. The U shape of said member 9 will permit visually verifying the condition of the device 1, 1' on several surfaces of this latter.

The uncovered portions of the retention member 9 in the form of a stirrup will be preferably located at least one the visible surface or surfaces of the device 1, 1' after its installation in the operative mounting position.

However, even on these surfaces, said member 9 could comprise (particularly at the level of the core of the U) a throat 9"" or a reinforcement of another type (at its surface or embedded, with lateral or perpendicular traversing), ensuring a passage between the two opposite surface of said member and adapted to be filled with overmolding material, so as to ensure good integration and cohesion of said member 9 with said overmolding material forming an essential portion of the body of said device 1, 1'.

As a modification of the preceding, it could also be provided, according to the invention, in the case of using a retention member 9, to omit the potting phase, particularly when the mounting of the components 2, 2' on the subassembly or subassemblies 3 is relatively rigid and the mounting of this latter in the support body 4 in cooperation with the member 9 is relatively stable and resistant.

Thus, you would pass directly from the pre-mounting and installation stage in the open support housing 4 (with the use of at least one member 9) to the overmolding phase under pressure, the subassemblies 3 being as the case may be themselves pre-potted or encapsulated structures in the protective housings, as a function of the nature and sensitivity of the components 2, 2'.

According to a preferred embodiment of the invention, shown in FIGS. 1 to 3 and 5 of the accompanying drawings, the support body 4 constitutes the structural framework of the device 1, 1', and defines at least certain ones of the external shapes of the final device 1, 1' and provides a container 4" in the form of an open housing that can receive at least one functional subassembly 3 in the form of a printed circuit card, as well as the end of the cable 5, the holding stirrup 9 closing at least partially the opening for the introduction of said housing 4" after snapping in and the potting affecting substantially only the interior of said housing 4", by covering and setting in the resin 6 the assembly of the components and subassemblies disposed in said housing 4" and by substantially filling the internal volume of this latter.

As shown in FIGS. 1 to 3 of the accompanying drawings, the support body 4 could for example comprise, as uncovered portions during potting and overmolding, lateral projections 11 formed of a single piece with said support body 4 and adapted to serve for the securement of the device 1, 1' (by screws or the like) during installation of this latter.

Moreover, said support body could also integrate, as the case may be, a portion in the form of a sleeve or groove 12 opening in the container 4" in the form of a housing and adapted to receive and to ensure the holding of the end of the connection and/or supply cable 5.

This portion 12 will preferably be filled during overmolding in a manner to fix the position of the end of the cable 5 and, as the case may be, may be prolonged by a supplemental tubular portion adapted to rigidify the corresponding covered portion of the cable 5 and to reinforce the mechanical connection of this latter with the device 1, 1'.

Figure 5:
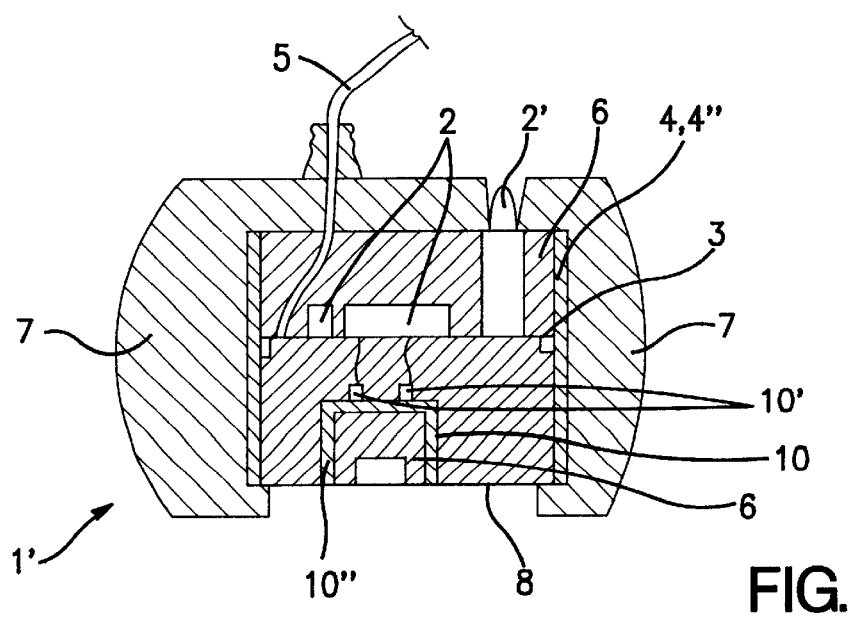
FIG. 5 is a side elevational cross-sectional view of a detector made according to the process of the invention, and, FIG. 6 is a side elevational cross-sectional view of an inductive sensor corresponding to a modified embodiment of the sensor shown in FIGS. 1 to 3.
Figure 6:
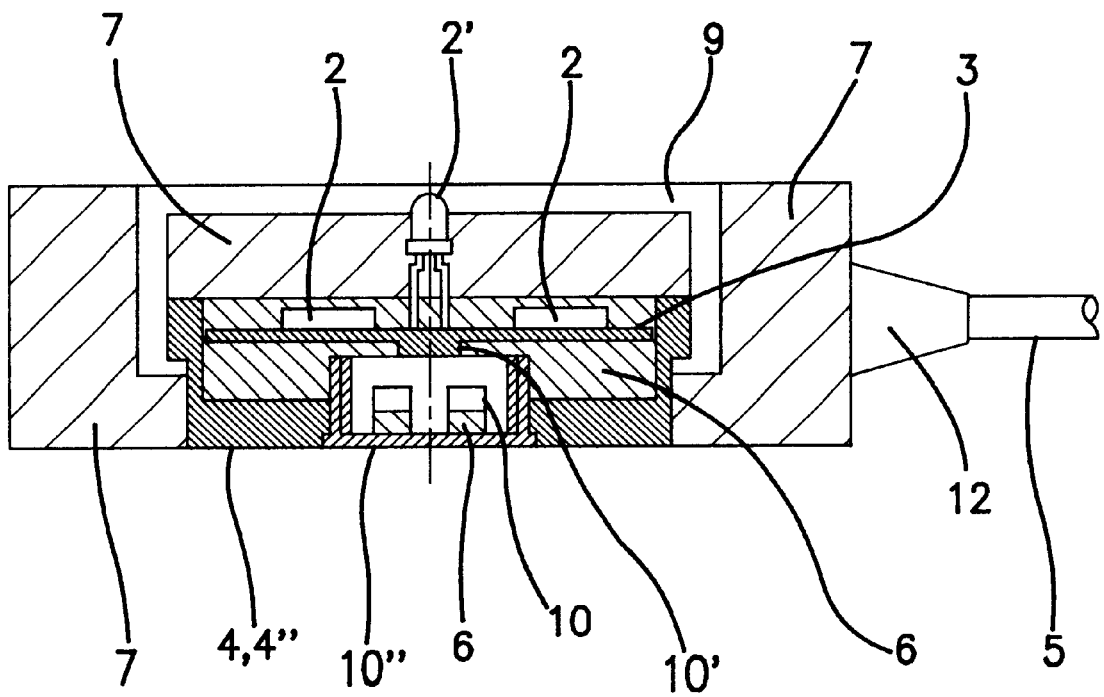

According to a supplemental characteristic of the invention, shown particularly in FIGS. 5 and 6 of the accompanying drawings, the process could moreover consist, in the case of an inductive probe or detector, in providing, prior to pre-mounting of the active components 2, 2' on and/or in the support body 4, the detector component 2 comprising the detection winding 10 in the form of a modular or potted subassembly by implantation of said winding 10 and external connection terminals 10' on or in a support member 10", and consecutive potting of the mounted assembly thus formed.

The invention also has for its object, as will be seen from FIGS. 1 to 3, 5 and 6 of the accompanying drawings, on the one hand, an apparatus or a measuring instrument and, on the other hand, a probe 1 or detector 1', characterized in that they are principally constituted by a monoblock potted hub enclosing particularly the different active component 2, 2' mounted on/in a support body 4 and an overmolded envelope or external shell 7, and in that it is obtained by means of the process according to the invention as described above.

Of course, the invention is not limited to the embodiments described and shown in the accompanying drawings. Modifications remain possible, particularly as to the construction of the various elements or by substitution of technical equivalents, without thereby departing from the scope of protection of the invention.

What is claimed is:

1. A process for making a measuring or detecting electronic device that includes plural active components, the process comprising the steps of:

providing a support body that is to be a mechanically supportive skeleton for the device;

positioning the active components in the support body in a desired arrangement;

holding the active components in the desired arrangement in the support body with a retention member that is attached to the support body;

at least partially encapsulating the support body, the active components and the retention member with a resin to form a substantially monoblock member that includes the support body, the active components and the retention member;

at least partially overmolding the monoblock member under pressure with a thermoplastic material that is compatible with the resin to form the measuring or detecting electronic device; and attaching the retention member to the support body by snap-in arrangement of distal ends of the retention member to opposing sides of the support body so that a portion of the retention member between the distal ends straddles and holds the active components.

2. The process according to claim 1, further comprising the step of providing a portion of the support body as an exterior surface of the device by not overmolding the portion with the thermoplastic overmolding material.

3. The process according to claim 1, before the encapsulating step, further comprising the step of connecting a supply cable to one of the active components, wherein during the encapsulating step a part of the supply cable is encapsulated in the resin, and wherein during the overmolding step a further portion of the supply cable is overmolded with the thermoplastic material, and further comprising the step of extending yet a further portion of the supply cable beyond an exterior surface of the device.

4. The process according to claim 1, further comprising the steps of filling an interior of the support body with the resin during the encapsulating step and covering at least a part of an exterior of the support body with the thermoplastic material during the overmolding step.

5. A process for making a measuring or detecting electronic device that includes plural active components, the process comprising the steps of:

providing a support body that is to be a mechanically supportive skeleton for the device;

positioning the active components in the support body in a desired arrangement;

holding the active components in the desired arrangement in the support body with a retention member that is attached to the support body;

at least partially encapsulating the support body, the active components and the retention member with a resin to form a substantially monoblock member that includes the support body, the active components and the retention member;

at least partially overmolding the monoblock member under pressure with a thermoplastic material that is compatible with the resin to form the measuring or detecting electronic device;

making a portion of the retention member translucent and having one of the active components illuminate and aligning the translucent portion of the retention member with the one of the active components that illuminates; and in the overmolding step, exposing the translucent portion of the retention member.

6. The process according to claim 5, further comprising the step of providing a portion of the support body as an exterior surface of the device by not overmolding the portion with the thermoplastic overmolding material.

7. The process according to claim 5, before the encapsulating step, further comprising the step of connecting a supply cable to one of the active components, wherein during the encapsulating step a part of the supply cable is encapsulated in the resin, and wherein during the overmolding step a further portion of the supply cable is overmolded with the thermoplastic material, and further comprising the step of extending yet a further portion of the supply cable beyond an exterior surface of the device.

8. The process according to claim 5, further comprising the steps of filling an interior of the support body with the resin during the encapsulating step and covering at least a part of an exterior of the support body with the thermoplastic material during the overmolding step.

* * * * *